Jan. 26, 1965  H. T. DRAUDT  3,167,330
COUPLING
Filed April 26, 1957  2 Sheets-Sheet 1
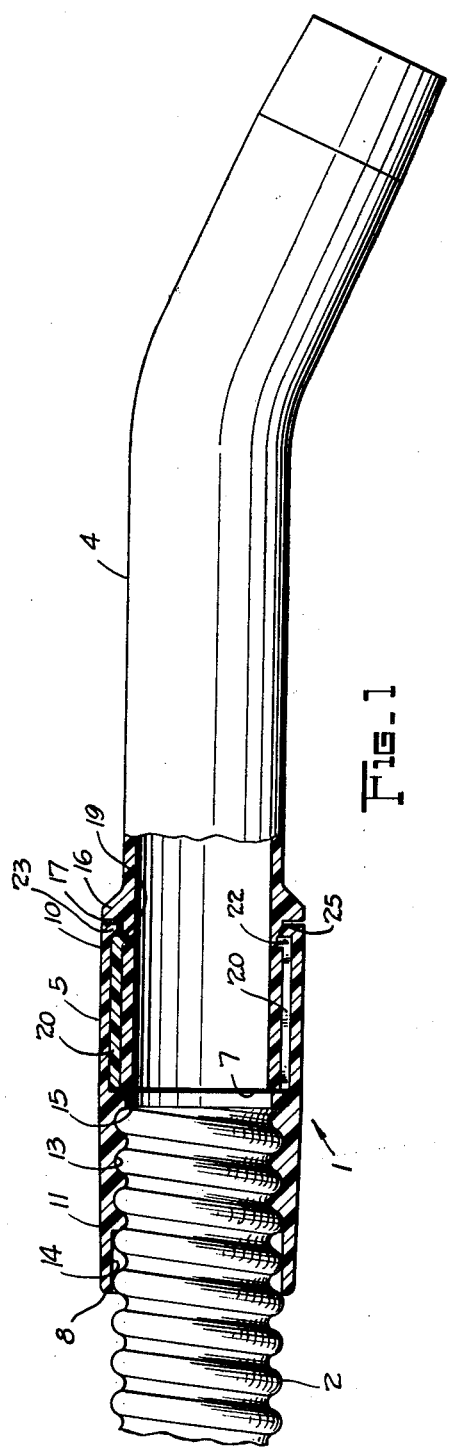
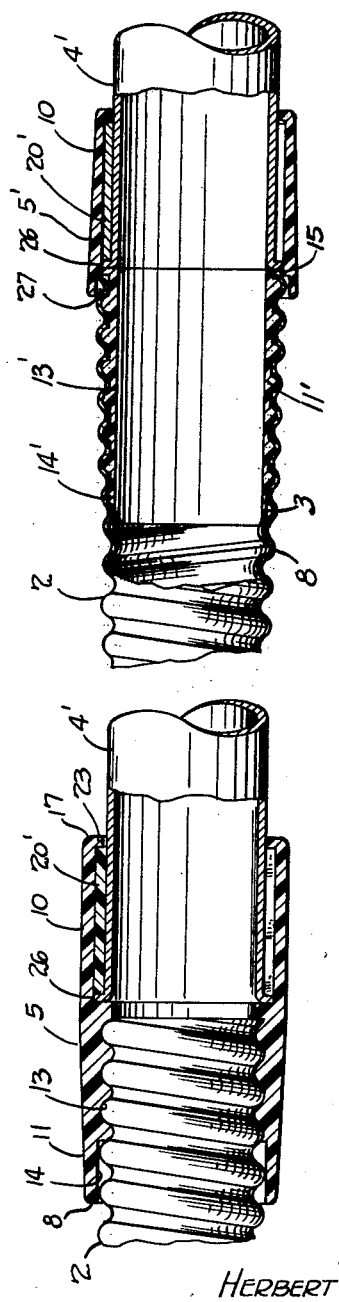
INVENTOR.
HERBERT T. DRAUDT
BY Bosworth, Sessions,
Herrstrom + Knowles
ATTORNEYS INVENTOR.
HERBERT T. DRAUDT
BY Bosworth, Sessions,
Herrstrom + Knowles
ATTORNEYS.

United States Patent Office 3,167,330
Patented Jan. 26, 1965

3,167,330
COUPLING
Herbert T. Draudt, North Olmsted, Ohio (3612 Clague Road, Cleveland 26, Ohio), assignor of one-half to Donald A. Draudt, North Olmsted, Ohio
Filed Apr. 26, 1957, Ser. No. 655,381
9 Claims. (Cl. 285—7)

My invention relates to coupling means and more particularly to coupling means for flexibly and swivelly joining a rigid tubular member to and with a flexible tubular member or hose. My invention is adapted for use in the vacuum cleaner art and more particularly is adapted to effect a coupling between the wand, upon which the various attachments are selectively mounted, and the hose which functions as a flexible conduit between the sweeper and the wand.

It is customary in the art to fabricate the wand from metal or a substantially non-flexible material and to effect the coupling between the wand and the flexible hose by sliding or forcing the hose over one end of the wand, the parts being of such relative size that the coupling thus effected is substantially air-tight and resists by friction, at least to some degree, or by catch means, accidental disengagement. Further it has been the usual practice to equip the wand, adjacent the end which engages the hose, with a swivel to facilitate the use of the wand and attachments by increasing the ease with which the user may turn, twist and maneuver the wand and therefore the attachment when and as needed in order to effectively use the attachments.

Such swivels have been commonly made by first enlarging the end portion of the metal tube, which forms the body of the wand, to form an internal shoulder a short distance from the end of the tube, then inserting a metal tubular nipple having a flanged end within the enlarged portion of the tube so that the flange abuts against the shoulder and finally bending or forcing the enlarged end of the tube loosely over the flange. This structure prevented the nipple from pulling out of the tube but permitted the tube and nipple, and therefore the tube and hose, which was pushed over and engaged by the free end of the nipple, to rotate or swivel relative to each other.

Difficulty has been experienced with such apparatus, especially when the hose is formed, as it commonly is, from an extruded plastic tube within which a coiled spring or wire helix is released to engage the interior wall of the tube to shape and strengthen the same. In such instances there has been a marked tendency for the hose to rupture, prematurely, adjacent the inserted end of the nipple because of the wear and strain induced on the hose by the action of the end of the rigid nipple as the hose and nipple are bent relative to each other during use. Further the conventional swivel has proven ineffective because the use of steel to steel or other bearing surfaces having high coefficients of friction necessitated making the swivel joint so loose, in order that it would swivel at all, that air leak became excessive and the nipple would cock and rack within the swivel joint, relative to the wand so as to engage the wand laterally and bind against the side of the joint thereby resisting and impeding relative rotational movement between the wand and nipple. Additionally such apparatus has proven disadvantageous because of the relatively high costs of production.

It is therefore a general object of my invention to provide an improved more efficient coupling for detachably coupling flexible and rigid tubular members together. Another object is the provision of such a coupling which may be produced and used with greater economy and ease than prior couplings for similar purposes and which protects the flexible tubular member from damage and wear due to bending relative to the rigid member to which it is coupled.

Further objects of my invention include the provision of a coupling for detachably coupling a flexible hose and a rigid tube or member, which is flexible; which forms a coupling which is substantially leakproof; and/or which, though secure against accidental disengagement, may be readily disengaged at the option of the user and the provision of a coupling for more efficiently, effectively and economically coupling a flexible tubular member with another tubular member.

Another object of my invention is the provision of a coupling for detachably securing a vacuum cleaner hose to and with a wand or other member, attachment or the like which prevents and/or mitigates against the fracturing, wearing and/or tearing of the hose in or near the zone at which coupling is effected.

A still further object of my invention is the provision of a coupling having the above described characteristics which includes means providing for rotational movement and swivelling of the one member being coupled relative to the other.

Other objects include the provision of a coupling having an improved, more efficient, easier operating swivel means for relative rotational movement between the members being coupled; which obviates cocking or angular lateral engagement between the members being coupled or parts of the coupling; which prevents binding and similar induced resistances to the relative rotational movement of the parts or members coupled; which is substantially leakproof; and which is easily and economically manufactured and/or used.

These and other objects and advantages of my invention will become apparent from the following description of preferred and modified forms thereof, reference being had to the drawings in which like reference characters refer to like parts and:

FIGURE 1 is a longitudinal section of a coupling embodying a preferred form of my invention and showing the wand and hose coupled thereby;

FIGURE 2 is a longitudinal section of another preferred form of my invention and showing the wand and hose coupled thereby;

FIGURE 3 is a longitudinal section of another preferred form of my invention and showing the wand and hose coupled thereby.

Figure 4:
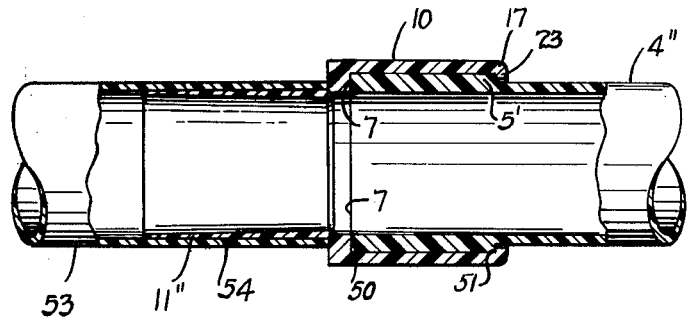
FIGURE 4 is a longitudinal section of a coupling embodying a modified form of my invention and showing the tubular members coupled thereby.

Broadly a coupling embodying my invention is adapted to couple a hose or flexible tubular member to a rigid tubular member and preferably includes a bearing member which is rotatably mounted on the rigid member adjacent one end thereof and a bendable or flexible coupling member or sleeve which is detachably held in position overlying said bearing member and extends axially beyond said bearing and rigid members and is secured along such extension to the hose or flexible member so that the coupling member and the hose or flexible member have adjacent surfaces which mutually engage and overlap and are axially co-extensive for a portion of their respective lengths. In those applications where relative rotational motion between the coupled members is not desired or needed the bearing member may be omitted and the coupling member or sleeve may be detachably mounted or secured directly to the rigid member.

Also, while I prefer that the coupling be detachably secured or mounted to or on one or the other of the members being coupled it is not without the scope of all of the precepts and objects of my invention to either detachably or fixedly secure or mount the coupling to or on both of the members being coupled.

More particularly, as seen in the drawings, a coupling embodying my invention is adapted to detachably couple a vacuum cleaner attachment hose to the longitudinally rigid instrument or member, commonly called a wand, upon which the various attachments are detachably mounted, and is particularly adapted for securing a hose, which is formed from a thin tube or cylinder of an extruded plastic, such as vinyl, within which a coiled or helical wire having a mean diameter slightly larger than the mean diameter of the tube is released and disposed. The wire strengthens and supports the extruded tube cylinder both radially and longitudinally so that the tube does not collapse or close during use and block the flow of air and entrained matter therethrough. The resultant hose has a corrugated or thread like external appearance. Further, a coupling embodying a preferred form of my invention may be used to couple a wand, made of plastic or other material and particularly adapted for use with my coupling, see FIGURE 1, for example, or with a conventional metal wand having a flared end, see FIGURES 2 and 3, for example.

A coupling embodying a preferred form of my invention is indicated generally at 1 in FIGURE 1, and is shown together with the hose 2, having the helical wire reinforcement 3, and wand 4 which are coupled thereby.

A coupling embodying my invention is preferably adapted to couple the flexible and rigid members, hose and wand for example, so that they may have easy, efficient rotational movement relative to each other, on the one hand, and may bend longitudinally relative to each other, on the other hand, all without deleterious effect on the hose and substantially without air leak between the coupling and the members coupled thereby, respectively, or between the parts of the coupling itself.

To this end the coupling 1 includes a longitudinally extending, somewhat flexible or elastic coupling member or sleeve 5 preferably of greater longitudinal rigidity than the hose. The sleeve may be made from any desirable material having the necessary resultant physical characteristics but is conveniently of molded vinyl plastic, having a durometer hardness on a Shore A scale of 85 to 90 when of the size proportions shown, and including a resinous plasticizer to inhibit and reduce plasticizer migration. When so formed the sleeve has the necessary strength and toughness to resist the abrasive action of the end 7 of the wand 4 thereupon when the hose and wand are bent relative to each other, as well as the necessary flexibility and softness to resistently bend to a limited degree in order to provide a smooth arcuate transition between the wand and the hose while precluding abrading the hose adjacent its own end 8.

The sleeve 5 is of generally cylindrical shape with a hollow, longitudinally extending interior the respective end portions 10 and 11 of which leftward and rightward end portions, as viewed, are adapted to overlap and be coextensive with a portion of the wand and hose respectively to the end that the same are coupled in an end-to-end relation and the bending motion of one is not transmitted directly to the other.

Further in order better to obtain the objects of my invention and prevent an abrupt and deleterious bending of the hose I prefer that the portion 11 of sleeve 5 be increasingly flexible from its end adjacent portion 10 of the sleeve, rightward end as viewed, to its free end, leftward end as viewed. Thus the free end of portion 11 of sleeve 5 is adapted to bend to a greater degree and with greater ease in response to a given force than the rightward end thereof and the degree and ease of bending of any increment of the portion 11 of sleeve 5 is proportional to the relative location of such increment to the respective ends of the portion 11 and the free end of portion 11 is adapted to bend with the hose to avoid abrading the same and the portion 11 of the sleeve in its entirety provides a smoothly bending or curving juncture between the hose and wand. Further since portion 11 of sleeve 5 can be bent toward any direction in the manner of a universal joint the motion and bending of the hose and portion 11 is not confined to a predetermined transverse plane but rather the hose may extend from the sleeve in any direction throughout the entire 360° of arc of a plane transverse to the axis of the sleeve.

When used to couple a hose of the type hereinbefore described, I preferably mold the portion 11 of the sleeve 5 with an internal thread or corrugation 13 (see FIGURES 1 and 2) which is complementary to the corrugations of the hose 2 so that the sleeve 5 may be screwed or threaded onto the hose in the same manner as a nut is threaded on a bolt. Where there is no need or desire to detach the sleeve from the hose an adhesive may be applied to the "threads" to make the junction therebetween permanent. Also, in order to facilitate the bending and give of the end 8 of the sleeve 5 with and relative to the hose 2 and to protect the hose more adequately and efficiently, I preferably terminate the thread 13 short of the end 8 of coupling 5 so as to provide a smooth cylindrical internal sleeve or skirt portion 14 having a diameter equal to or just slightly larger than the maximum at rest outside diameter of the hose.

The other end of the threads 13 preferably terminate in an internal shoulder or stop 15, which is disposed about midway the length of the sleeve and is adapted to form a seat for and more particularly separate the adjacent ends of the respective members being coupled; otherwise the members are so positioned within the coupling so as to have their adjacent ends in end to end relationship.

The wand is of generally hollow cylindrical shape and is relatively hard and longitudinally rigid in order to provide a handle for the user and a mounting, for the attachments, which rigidly sustains the attachments relative to the user's hand so that the user may properly and easily guide and direct the attachments over the surface being cleaned.

Also in order that the attachments may be used with maximum effectiveness and ease it is desirable that the user be able to direct them in any direction while the sweeper and hose remain in one position and therefore it is preferred that the wand have rotative motion relative to the hose. To this end my coupling preferably includes swivelling means, provided between the wand and the sleeve 5, which is also adapted to cooperate with the sleeve to detachably secure the same in overlapping relationship with the wand.

A coupling embodying my invention may be used with different wands and I have shown, by way of example, preferred embodiments thereof adapted for coupling a molded plastic wand 4, particularly adapted for use with my invention, see FIGURE 1, and a conventional flared end metal wand 4', see FIGURES 2 and 3. As shown in FIGURE 1 the wand 4 is provided with an external circumferential shoulder 16, which is spaced from the end 7 of the wand by a distance equal to or just slightly longer than the distance between the near end 17 and shoulder 15 of the sleeve 5, and an external circumferential groove 19, which is longitudinally slightly nearer the end 7 of the wand than the rear face of the shoulder 16. Preferably shoulder 16 and portion 10 of sleeve 5 have the same external diameter.

A preferably split bearing 20 conveniently formed from a butadiene-styrene co-polymer, nylon or similar material having a low co-efficient of friction with the wand, and having an inwardly facing lip or flange 22 adapted to seat in the groove 19, is disposed over the wand 4. The bearing 20 extends from the groove 19 toward the end 7 of the wand. The bearing 20 is rotatable relative to the wand and is held in place about and against the wand by the interlock between the groove 19 and lip 22 and by its spring or natural tendency to assume its most efficient (cylindrical) shape. The internal diameter of the body of the bearing 20 is equal to or only slightly larger than the adjacent external diameter of the wand and the external diameter of the bearing 20 is preferably less than that of the shoulder 16 by an amount equal to about twice the diametrical thickness of the end portion 10 of the sleeve 5, which engages it firmly.

The bearing 20, when split, is positioned by expanding the same sufficiently to permit the lip 22 to slide over the end 7 of the wand and then pushing the bearing along the wand until the lip seats in the groove 19.

In order that the sleeve 5 may be detachably secured to the wand, the end 17 thereof is formed with an internal lip or flange 23 which has an internal diameter less than the external diameter of the bearing 20 but greater than the outside diameter of the wand intermediate the shoulder 16 and the groove 19 and a length substantially equal to the distance between the shoulder 16 and the groove 19.

The length of the portion 10 of the sleeve 5 between the shoulder 15 and the lip 23 is preferably about equal to or just slightly less than, the distance from the end 7 of the wand to the remote end 25 of the bearing 20 to the end that when the sleeve 5 is forced over the bearing 20 the lip 23 of sleeve 5 seats in the space between the shoulder 16 and the lip 22 of bearing 20.

In use the sleeve is positioned on the hose and the bearing on the wand in the manner aforesaid and the lip 23 of the sleeve 5 is then stretched and placed over the bearing and the sleeve is then pushed along the bearing until the lip 23 seats between the bearing 20 and the shoulder 16. The wand and hose are then detachably though securely joined together and are easily rotated and bent relative to each other without undue damage to the hose.

As shown in FIGURE 2 the wand 4' has a flared end or flange 26. In this instance the hose 2 and sleeve 5 are conveniently the same as in FIGURE 1 and the bearing 20' has the same purpose and function as the bearing 20 and is a split bushing of substantially the same shape except that no lip corresponding to the lip 22 in FIGURE 1 is provided thereon. The internal diameter of the bearing 20' is greater than the external diameter of the wand 4' and less than the external diameter of the flange 26. The length of the bearing 20' is preferably less than the distance between the shoulder 15 and lip 23 of the sleeve 5 by the same or slightly more than the thickness of the flange 26 so that relative rotational but substantially no longitudinal movement is possible between the wand 4' and the sleeve 5.

The relationship between the outside diameter of the bearing 20' and the adjacent inside diameter of the sleeve 5 is the same as with the bearing 20 and sleeve 5.

The coupling shown in FIGURE 2 is assembled by expanding the split bearing 20' and placing it over the wand 4' and against the flange 26. The portion 11 of the sleeve 5 is meanwhile assembled on the hose 2 in the manner set forth above and the portion 10 of the sleeve is then positioned over the bearing 20' in the same manner as it is positioned over the bearing 20 and is held in place by the interaction of the flange 26, shoulder 15, bearing 20' and lip 23 but may be removed, if desired, by expanding the lip 23 and pushing it leftwardly as viewed until it is seated over the bearing and then pulling the entire sleeve rearwardly off the bearing and wand.

With the embodiment of my invention shown in FIGURES 1 and 2 there may be some inconvenience under some circumstances in assembling the end 11 of the sleeve 5 onto the hose 2 and in retaining the sleeve on the hose, during use, because of the natural characteristics of the wire helix reinforcement which shapes and supports the hose wall. This follows from the fact that the external diameter of a helix is enlarged when the helix is compressed and is reduced when the helix is stretched and tensioned and the fact that when the sleeve 5 is disposed externally of the hose 2 the natural effect is to compress the hose and expand the helix as the sleeve is threaded on the hose thereby increasing the resistance to such threading and making assembly more difficult, and to stretch the hose and contract the helix when pulling, pushing or tugging on the wand and hose thereby tending to cause the threads of the hose and sleeve to separate and permit the hose to pull out of the sleeve.

For those instances where such tendencies are undesirable I provide the preferred form of my invention disclosed in FIGURE 3. In this form of my invention the sleeve 5' is adapted to function for the same purposes and to the same ends as the sleeve 5 and in addition is adapted to co-operate with the hose 2, which is to be coupled thereby, to utilize the natural tendencies of the wire helix reinforcement 3 to expand and contract when compressed or stretched, respectively, to facilitate the assembly of the hose and coupling and to aid in maintaining the engagement therebetween.

As shown in FIGURE 3, the end 11' of the sleeve 5' is tubular and is provided with threads or corrugations 13' for engagement with the threads or corrugations of the hose 2. However in this instance the end 11' of the sleeve is adapted to be disposed within the hose 2 and the threads 13' are formed on the exterior of the end 11' and engage the threads of the hose interiorly. Thus, as the hose is compressed, when the hose and sleeve are screwed together the wire reinforcement expands and assembly is made easier and as the hose is stretched or tensioned, during use, the wire reinforcement contracts and the grip or engagement between the hose and sleeve is enhanced.

The end 11' is preferably formed with an unthreaded end portion or skirt 14' which functions in the same manner and for the same purpose as the skirt 14 of sleeve 5. To further lock the hose 2 into engagement with the sleeve 5' I preferably provide the sleeve 5' with an axially extending groove or recess 27 which is adapted to receive the tip of the hose 2 and to frictionally engage the same in cooperation with the adjacent portion of the thread 13'. The recess 27 is disposed at the inner end of the end 11' of the sleeve 5' and opens toward the hose end, i.e. leftwardly as viewed. As shown the end 10 of sleeve 5' is substantially similar to the end 10 of sleeve 5 and functions in the same way to obtain the same result.

Figure 5:
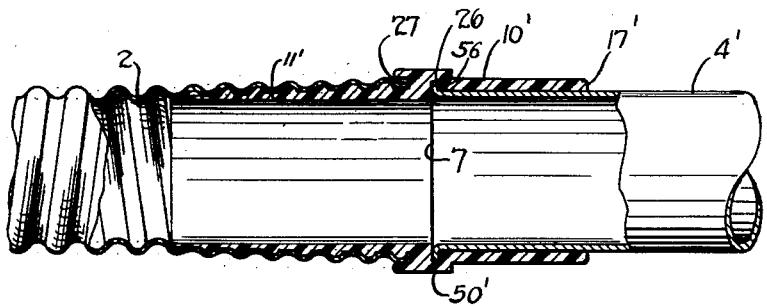
FIGURE 5 is a longitudinal section of another coupling embodying my invention and showing the tubular members coupled thereby.

FIGURES 4 and 5 disclose modified forms of couplings embodying my invention particularly adapted for use in those instances where relative rotational motion between the coupled members is not needed or may conveniently be accomplished with relative difficulty. FIGURE 4 further discloses a coupling embodying my invention for use with a hose or flexible member which has a smooth cylindrical wall for engagement with the coupling member.

Each of the couplings shown in FIGURES 4 and 5 has a sleeve 50 and 50', respectively, which is otherwise substantially similar in structure and purpose and otherwise functions to obtain the same results as the sleeves 5 and 5' described above but the sleeves 50 and 50' engage the rigid member, wands 4" and 4' respectively, for example, directly and not through an intermediary such as the bearings 20 and 20'.

As shown in FIGURE 4 the sleeve 50 has one portion 10, which overlies and is concentric with a part of the rigid member or wand to be coupled, and a second portion 11", which is concentric and axially coextensive with a part of the flexible member or hose to be coupled. As shown the portion 10 of sleeve 50 is similar in shape to the portion 10 of the sleeve 5. In order to provide direct engagement between the sleeve 50 and the wand 4", the wand is provided with an external shoulder 51, which faces away from the end 7 of the wand and has a length equal to the distance between the shoulder 15 and lip 23 of the sleeve and an external diameter substantially equal to or slightly less than the internal diameter of the portion 10 of sleeve 5.

The end 11" of sleeve 50 is adapted to engage the flexible member or hose. Conveniently portion 11" of sleeve 50 is adapted to engage interiorly a hose 53 having a smooth interior surface and is therefore provided with a smooth cylindrical exterior surface 54 of such diameter as to tightly engage the hose 53, and hose 53 and surface 54 are preferably further secured against accidental disengagement by the use of an adhesive therebetween. Alternatively sleeve portion 11" can be adapted to engage hose 53 exteriorly.

The sleeve 50', FIGURE 5, has a portion 10' (rightwardly as viewed), which is adapted for direct engagement and coupling with a rigid member having a flanged end such as the metal wand 4' shown in FIGURES 2 and 3. As shown in FIGURE 5 the portion 10' of the sleeve 50' has an interior diameter which snugly engages that portion of the wand 4' adjacent or to the rightward, as viewed, of the flange 26 and is further provided with an arcuate groove 56 which is complementary to and snugly engages the flange 26. The end of sleeve 50' which is adapted to engage the flexible member or hose is shown conveniently as being similar to the end 11' of sleeve 5'.

While I have illustrated the preferred and modified forms of my inventions with examples of sleeves embodying specific examples of end portions adapted for engagement with the tubular members to be coupled respectively the choice of such end portions to include in any given sleeve is only limited by the purpose and conditions for and under which the coupling embodying my invention is to be used.

Modifications, changes and improvements to the embodiments of my invention herein described may occur to those skilled in the art who come to understand the precepts and principles of my invention. Therefore, I do not wish to be limited in the scope of my patent by the preferred and modified forms of my invention herein illustrated and described nor in any manner inconsistant with the advance by which my invention has promoted the art.

I claim:

1. In combination a thin-walled flexible tubular member having a wire reinforcement therein forming a corrugated surface, a rigid tubular member and coupling means for joining said tubular member in end to end relationship, said coupling means comprising an elongated hollow sleeve member having one end portion extending longitudinally and concentrically with said flexible member and another end portion extending longitudinally and concentrically with said rigid member, said one end portion being disposed in said flexible member, being flexible but of greater rigidity than said flexible member and being of increasing flexibility in a direction away from said another end portion and having an exterior surface corrugated complementarily to said flexible member, said sleeve having an arcuate rearwardly opening groove with an arcuate axially parallel flange intermediate the ends thereof and said flexible member overlapping said one end portion of said sleeve and having an end disposed within said groove and engaged between said flange and the adjacent corrugation on said surface of said one end portion of said sleeve.

2. The combination according to claim 1 in which said flexible member comprises a thin-walled flexible tubular member having a helical wire reinforcement disposed therein and forming a corrugated surface and said another end of said sleeve has a complementarily corrugated surface for engagement therewith and includes means for bending with and cushioning and modulating the bending of said flexible member about said coupling, said last named means including said another end being flexible but of greater rigidity than said flexible tubular member and being progressively more flexible in a direction away from said one end of said sleeve.

3. In combination a thin-walled flexible tubular member having a helical wire reinforcement disposed therein and forming a corrugated surface, a rigid tubular member having an end and means for coupling said end of said rigid member and said flexible member in end to end relationship, said means comprising a flexible, hollow, longitudinally extending sleeve of greater rigidity than said flexible member, said sleeve having one end portion adapted to engage and extend longitudinally and concentrically with a portion of said flexible member and having another end portion adapted to engage and extend longitudinally and concentrically with a portion of said rigid member, said another end portion of said sleeve having a circumferential internally extending lip longitudinally spaced from said one end of said sleeve, said end of said rigid member being disposed within said another end of said sleeve intermediate said lip and said one end of said sleeve and at least a part of said rigid member intermediate said end thereof and said lip having a greater external diameter than the internal diameter of said lip, said one end of said sleeve being progressively more flexible in a direction away from said another end of said sleeve and being disposed in said flexible member and having an exterior surface corrugated complementarily to said flexible member and in engagement therewith, said sleeve having an arcuate rearwardly opening groove with an arcuate axially parallel flange intermediate the ends thereof and said flexible member overlapping said one end portion of said sleeve and having an end disposed within said groove and engaged between said flange and the adjacent corrugation on said surface of said one end portion of said sleeve.

4. The combination according to claim 3 in which said corrugations are of progressively lesser external diameter and said sleeve is of progressively greater flexibility in a direction away from said another end of said sleeve.

5. In the combination of a flexible tubular member comprising a thin walled plastic tube characterized by lacking sufficient stiffness to be self-sustaining and a helical wire reinforcement disposed within said tube to sustain it and imparting a corrugated surface thereto, a rigid tubular member, and coupling means for joining said tubular members in end to end relationship, the improvement of said coupling means comprising a unitary, elongated hollow sleeve member having one end portion extending longitudinally and concentrically with said rigid member and another end portion having a longitudinal axis and a surface corrugated complementarily to said flexible tubular member, said coupling means including means interlocking with said rigid member and restraining said coupling means and said rigid member against relative longitudinal displacement, said another end portion of said sleeve member being in longitudinally extending complementary engagement with said flexible member and comprising means for bending with and cushioning and modulating the bending of said flexible member at said coupling means and relative to said axis, said last named means comprising said another end portion of said sleeve being flexible but of greater rigidity than said flexible member and being of progressively increasing flexibility in the direction of engagement with said flexible member.

6. In the combination of a flexible tubular member, a rigid tubular member having an end, and a coupling for joining said tubular members in end to end relationship, the improvement of said coupling comprising a unitary, elongated hollow sleeve member having one end portion engaging and extending longitudinally and concentrically with a portion of said rigid tubular member and a second end portion in longitudinally extending, complementary engagement with said flexible tubular member, said coupling including means interlocking with said rigid tubular member to restrain said coupling and rigid tubular member against relative longitudinal displacement, said last named means including a part of said one end portion of said sleeve being longitudinally spaced from said another end, a portion of said rigid tubular member being disposed intermediate said part of said one end portion of said sleeve and said another end portion of said sleeve, said part of said one end portion of said sleeve having a lesser internal diameter than at least a part of said portion of said rigid tubular member.

7. The combination according to claim 6 in which said rigid tubular member has a flanged end, said sleeve has an internal circumferential groove intermediate said another end portion of said sleeve and said part of said one end portion of said sleeve, and said flanged end is disposed in said groove.

8. A coupling for coupling a flexible tubular member having an end to another tubular member in end to end relationship, said coupling comprising a unitary hollow, tubular, longitudinally extending sleeve having one end portion adapted to engage and extend longitudinally and concentrically within the flexible member to be coupled and being flexible but having greater rigidity than the flexible member to be coupled, the flexibility of said one end portion of said sleeve being least at that part of said end portion of said sleeve which is adapted to be nearest said end of the flexible member to be coupled when said coupling is in engagement therewith and greatest at that part of said end portion of said sleeve which extends the furthest within said flexible member to be coupled when said coupling is in engagement therewith, and said sleeve having an arcuate groove opening in the direction in which said one end portion of said sleeve extends and adapted to receive and grip said end of the flexible member to be coupled.

9. The coupling according to claim 8 in which said one end portion of said sleeve has a corrugated external surface, said groove is formed by an axially parallel flange, and is adjacent a said corrugation and the end of the flexible member to be coupled is disposed within said groove and engaged between said flange and adjacent corrugation.

References Cited in the file of this patent

UNITED STATES PATENTS

| | | |
|---|---|---|
| 992,426 | James | May 16, 1911 |
| 1,354,710 | Wise | Oct. 5, 1920 |
| 2,300,057 | Meyer | Oct. 27, 1942 |
| 2,460,851 | Sheppard | Feb. 8, 1949 |
| 2,469,261 | Cooper | May 3, 1949 |
| 2,470,359 | McLean | May 17, 1949 |
| 2,516,583 | Moore | July 25, 1950 |
| 2,570,347 | Humphrey | Oct. 9, 1951 |
| 2,686,962 | Swann | Aug. 24, 1954 |
| 2,705,651 | Myers | Apr. 5, 1955 |
| 2,741,496 | Melsom | Apr. 10, 1956 |
| 2,747,217 | Stahl | May 29, 1956 |
| 2,750,210 | Trogdon | June 12, 1956 |
| 2,776,151 | Harkenrider | Jan. 1, 1957 |

FOREIGN PATENTS

| | | |
|---|---|---|
| 834,463 | France | Aug. 16, 1938 |
| 86 | Great Britain | Jan. 1, 1898 |
| 570,815 | Great Britain | July 24, 1945 |
| 739,575 | Great Britain | Nov. 2, 1955 |